United States Patent Office 3,011,975
Patented Dec. 5, 1961

3,011,975
HEAT-STABLE ORGANOSILOXANE GREASE CONTAINING A SOLID POLYMERIC FLUOROCARBON COMPOUND
Siegfried Nitzsche and Rudolf Riedle, Burghausen, Upper Bavaria, Germany, assignors to Wacker Chemie G.m.b.H., Munich, Bavaria, Germany
No Drawing. Filed Feb. 25, 1958, Ser. No. 717,333
Claims priority, application Germany Feb. 28, 1957
9 Claims. (Cl. 252—25)

This invention relates to new compositions exhibiting excellent thermal stability and retaining their grease-like consistency at high temperatures while remaining grease-like at low temperatures.

It is generally known that heat-stable pastes of grease-like consistency can be obtained by mixing fluid organopolysiloxanes with suitable inorganic fillers. When the organopolysiloxane employed is a fluid which is not heat hardenable, the resulting pastes do not thicken, gel or harden even after long exposure to heat. However, while such pastes do not thicken, they are subject to a similar deficiency in that they lose their grease-like consistency and become fluid after extended exposure to heat.

The organopolysiloxane-inorganic filler combinations heretofore employed could be used briefly at high temperatures without loss of the grease-like consistency. Once the desired consistency was lost it could be restored and the fluid rethickened by the further addition of quantities of filler, but exposure to heat would again cause the material to become fluid-like rather than grease-like.

It has also been known to add a variety of solid materials to organopolysiloxane fluids without producing grease-like compositions. For example, graphite or molybdenum disulfide can be admixed with organopolysiloxane oils to improve the lubricating characteristics of such oils without appreciably altering their physical characteristics as oils. Such mixtures cannot be described as grease-like. They are merely viscous fluids without dimensional stability. They readily flow to form a thin layer after standing for a very short time. The pastes of this invention, however, resist deformation by internal force (i.e. they do not flow) and they will retain a specific shape imparted to them by outside forces. In short, they are grease-like and retain their characteristics when exposed to heat for extended periods of time.

It is the object of this invention to prepare grease-like compositions based on organosiloxane fluids, said compositions being characterized by the retention of the grease-like consistency after extended and repeated exposure to high temperature. Further objects and advantages achieved through this invention are disclosed in or are apparent from the disclosure and claims which follow.

The heat-stable pastes of this invention consist essentially of a mixture of (1) an organopolysiloxane fluid of the general formula

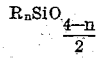

wherein $n$ has an average value of 1.9 to 3.0 inclusive and each R represents a monovalent hydrocarbon radical or halogenated monovalent hydrocarbon radical, (2) a minor amount of a polymeric fluorocarbon compound, and (3) if desired, a filler, a solid lubricant additive or both. These pastes can quite surprisingly, be made up of the siloxane, fluorocarbon compound and additives which heretofore did not produce the grease-like consistency desired.

The polymeric fluorocarbon compounds operable in this invention are prepared by methods well known in the art. Monomeric, fluorine-containing unsaturated organic compounds are polymerized to form extremely heat resistant products. Specific examples of such materials are polytetrafluoroethylene, polytrifluoromonochloroethylene, polyperfluoropropylene, polyfluorochloropropylenes, and so forth.

The organopolysiloxane component of this invention can be any of the well-known organopolysiloxane fluids commonly known as silicone oils. These organopolysiloxane oils are well known in the art. Any of the well-known methods of preparing such oils can be employed and oils of widely varying viscosity (e.g. 10 cs.–100,000 cs. at 25° C.) can be employed. The organopolysiloxane is made up of units of the formula

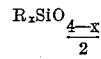

where $x$ can be 0, 1, 2 or 3, and R is as above defined. However, on the average there will be from 1.9 to 3 organic substituents per silicon atom in the operable oils. The organic substituents, designated in the formula as "R," are monovalent hydrocarbon radicals including alkyl radicals such as methyl, propyl and octadecyl; aryl radicals such as phenyl and anthracyl; alkaryl radicals such as tolyl and methylnaphthyl; aralkyl radicals such as benzyl and phenylethyl; cycloaliphatic radicals such as cyclobutyl and cyclopentyl; and alkenyl radicals such as vinyl, allyl and octadecenyl. Halogenated monovalent hydrocarbon substituents are also operable and examples of such substituents include chloromethyls, perfluoroethyl, chlorophenyls, bromotolyls, iodobenzyl, chlorocyclobutyl, chlorallyl, 3,3,3-trifluoropropyl, and so forth. Preferred substituents include methyl, phenyl, ethyl and fluorinated, brominated or chlorinated derivatives thereof.

The organopolysiloxane can be a homopolymer such as dimethylsiloxane or phenylmethylsiloxane. Also operative are copolymers of various units such as copolymers of vinylmethylsiloxane and dimethylsiloxane, copolymers of methylpropylsiloxane and trimethylsiloxane (i.e. Me$_3$SiO[MePrSiO]$_x$SiMe$_3$, where Me=methyl and Pr=propyl). Furthermore, mixtures of organisiloxane polymers and/or copolymers can be employed. The siloxane can be linear, branched chain or cyclic. The only restriction known to the inventors is that the siloxane should not thicken, gel or harden when it is heated and this restriction is reflected in the requirement that there be an average of from 1.9 to 3 organic substituents per silicon atom thereby reducing the possible points of cross linkage to a minimum.

In addition to the siloxane and fluorocarbon constituents, inorganic fillers can be employed in the compositions of this invention. Any of the known absorbtive, heat-stable fillers heretofore employed in conjunction with organopolysiloxane fluids can be employed herein. The well-known, widely employed silica fillers are particularly useful. Such silica fillers can be naturally occurring such as diatomaceous earth or crushed quartz, or they can be manufactured silicas such as fume silicas, silica aerogels and silica xerogels. The silica fillers can be surface treated silicas such as are disclosed in United States patent applications, Serial No. 160,100, filed May 4, 1950, now Patent No. 2,863,846, issued December 9, 1958; Serial No. 640,505, filed February 15, 1957, now Patent No. 2,897,869, issued August 4, 1959; and Patent No. 2,610,167, issued September 9, 1952. Of course, any means may be employed to treat or modify the filler without departing from the spirit and scope of this invention. Other fillers well known in the art are also operative herein. The silica is employed in amounts sufficient to give the desired consistency. Thus more filler will probably be employed with a thin fluid than with a viscous fluid. The amount of filler employed will be readily determined by the person compounding the paste or grease.

Another class of materials which can be present in the compositions of this invention can be described as non-hygroscopic, solid materials which do not act as fillers. Particularly useful are those solids which, though they do not function as fillers, serve to improve the lubricating qualities of the compositions (e.g. graphite and molybdenum disulfide). It is surprising that pastes which retain their consistency even when exposed to temperatures exceeding 100° C. can be made from fluid siloxanes and solid materials which do not serve as fillers by adding small amounts of polymeric fluorocarbon compounds as taught herein.

The polymeric fluorocarbon additives are employed in the compositions of this invention in surprisingly small proportions. The desired effect is obtained with quantities in the range of 0.05% to 3% by weight of the fluorocarbon based on the organopolysiloxane fluid present. The maximum and minimum figures expressed are not necessarily operative limits, but when the fluorocarbon is present to the extent of less than .05 percent the desired results are not realized to any appreciable extent. Furthermore, proportions of fluorocarbon exceeding 3 percent will often result in loss of the lubricant-pastelike qualities.

The applicants contemplate the addition of minor amounts of additives such as pigments, dyes, oxidation inhibitors and other materials commonly employed in greases, lubricants, pastes and ointments to the essential compositions of this invention. Compositions containing such additives are intended to be covered by this disclosure.

The ingredients of the compositions of this invention are merely admixed in any desired order. It is desirable to thoroughly and evenly disperse the fluorocarbon material throughout the composition. However, the ingredients can be admixed in any desired manner and in any desired order. One particularly useful method is to form a very stiff, thick paste from a small quantity of organopolysiloxane fluid and a large quantity of filler. The fluorocarbon material is then thoroughly milled into the paste and is evenly dispersed through the paste. More fluid and filler can then be added to secure the desired consistency.

The compositions of this invention are useful as lubricants, for release applications and for the wide variety of uses for thickened siloxane fluids heretofore known and disclosed.

The following examples are included to aid in understanding and practicing this invention and are not intended to delineate the scope of this invention. The consistency of the pastes in the examples was measured in terms of micropenetration. A small standard cone is placed point downward on the surface of the paste. The cone is permitted to penetrate into the paste for 5 seconds. The amount of penetration is measured in tenths of millimeters and the number of tenths of millimeters' penetration is the micropenetration value. Thus, a softer and more fluid material will obviously have a higher micropenetration value.

Example 1

60 g. of finely ground, pulverulent lubricating molybdenum disulfide and 70 g. of a phenyl methyl polysiloxane fluid were thoroughly admixed on a mill to form a soft paste designated as Product A.

60 g. of the same molybdenum disulfide and 70 g. of the same phenylmethylsiloxane fluid and 0.1 g. of an aqueous suspension of polytetrafluoroethylene with a solids content of 60% were thoroughly admixed to form a paste which was somewhat firmer than Product A and was designated as Product B.

Similarly 60 g. molybdenum disulfide powder, 70 g. of the same phenylmethylsiloxane fluid and 0.8 g. of the polytetrafluoroethylene suspension were admixed to form Product C which was a paste similar to, but firmer than Product B.

From these three pastes the micropenetration was determined and finally a heat aging for 15 hours at 200° C. was carried out. The influence of the polymeric fluorocarbon material on the heat stability of the paste can be determined from the following table:

|  | Product A | Product B | Product C |
| --- | --- | --- | --- |
| Micropenetration after mixing | 81 | 70 | 66 |
| After 15 hrs. at 200° C | (¹) | 105 | 61 |

¹ Not measurable since it became fluid.

Example 2

0.85 g. of an aqueous dispersion of polytetrafluoroethylene (60%) was added to 85 g. of a linear dimethylsiloxane fluid and the mixture was homogenized in a high speed (intensive) mixer. 15 g. of fume silica was slowly added to this mixture. The paste was processed on a mill until it was fully homogeneous and uniform. A grease-like product was obtained having a micropenetration of 40. After heat aging the product for 15 hours at 200° C. the value of the micropenetration had risen to 63. After another 72 hours at 200° C. it was 112.

The same test was carried out without the addition of the polytetrafluoroethylene to the siloxane-silica filler composition and a product with a micropenetration of 34 was obtained. After 15 hours of heating at 200° C. the product had a mushy consistency and the micropenetration could no longer be measured. The grease-like consistency of this control composition disappeared after heating.

Example 3

85 g. of a branched chain phenyl methyl siloxane fluid was well mixed with 15 g. of a fume silica treated with methylchlorosilanes in accordance with the art, and 0.02 g. of pure polytetrafluoroethylene. The mixture was processed on a mill until it was fully homogeneous. A paste with a micropenetration of 133 was obtained. After heating for 15 hours at 200° C., the micropenetration had increased to 215. The same test was carried out without the addition of the 0.02 g. of polytetrafluoroethylene and a paste with a micropenetration of 122 was obtained. After 15 hours heating at 200° C. the control had lost its grease-like consistency and had become a viscous fluid.

Example 4

0.03 g. polytetrafluoroethylene and enough of a chlorophenyl methyl polysiloxane fluid to get a micropenetration of 50 from a paste homogenized on a mill were added to a mixture of 3 g. of a surface treated silica, 3 g. of extra fine magnesium oxide and 3 g. of diatomaceous earth. This paste was heated for 40 hours at 200° C. and the value of the measured micropenetration increased to 95. The same test was carried out without the addition of the polymeric fluorocarbon compound and a paste was obtained whose micropenetration increased from 50 to 200 after the heat aging.

Example 5

Equivalent compositions are obtained when polychlorotrifluoroethylene, polyperfluoropropylene, or polymonochloropentafluoropropylene is substituted for the polytetrafluoroethylene in Example 1.

Example 6

Equivalent results are obtained when each of the following polysiloxanes is substituted for the dimethylsiloxane fluid of Example 2: phenylethylpolysiloxane; vinyldimethyl endblocked dimethylpolysiloxane; a copolymer of 5 mol percent vinylmethylsiloxane, 20 mol percent phenylmethylsiloxane and 75 mol percent dimethylsiloxane; a mixture of dimethylpolysiloxane and chlorophenylmethylsiloxane; a copolymer of 3,3,3-trifluoropropylmethylsiloxane, methyloctadecylsiloxane, vinyldimethylsiloxane and dimethylsiloxane; and a copolymer of bromophenylmethylsiloxane, diphenylsiloxane and methylphenylsiloxane.

That which is claimed is:

1. A heat-stable grease consisting essentially of (1) an organopolysiloxane fluid, (2) a solid polymeric fluorocarbon compound, and (3) an absorptive, heat-stable, inorganic filler, the fluorocarbon compound (2) being present in an amount of from .05 to 3.0 percent by weight based on the weight of the organopolysiloxane fluid (1), and the filler (3) being present in an amount sufficient to produce the desired consistency.

2. The grease of claim 1 further characterized in that the organopolysiloxane fluid is a polymer of the general unit formula $$R_n SiO_{\frac{4-n}{2}}$$

wherein $n$ has an average value of from 1.9 to 3.0 inclusive and each R represents an organic radical selected from the group consisting of monovalent hydrocarbon radicals and halogenated monovalent hydrocarbon radicals.

3. The grease of claim 1 further characterized in that the polymeric fluorocarbon compound is selected from the group consisting of polytetrafluoroethylene and polymonochlorotrifluoroethylene.

4. The grease of claim 1 wherein the filler is a silica filler.

5. The grease of claim 1 wherein the organopolysiloxane fluid is selected from the group consisting of dimethylpolysiloxanes, phenylmethylpolysiloxanes and chlorophenylmethylpolysiloxanes.

6. A heat stable paste consisting essentially of an organopolysiloxane fluid, a non-hygroscopic solid lubricant additive, and .05 to 3.0 percent by weight based on the weight of the organopolysiloxane fluid of a solid polymeric fluorocarbon compound.

7. A grease of improved heat stability consisting essentially of (1) 70 parts by weight diorganosiloxane fluid wherein the organic substituents are monovalent hydrocarbon radicals, (2) 60 parts by weight molybdenum disulfide powder, and (3) 0.8 part by weight of an aqueous suspension of polytetrafluoroethylene containing 60% by weight solids.

8. A grease of improved heat stability consisting essentially of (1) 85 parts by weight diorganosiloxane fluid wherein the organic substituents are monovalent hydrocarbon radicals, (2) 15 parts by weight fume silica and (3) .51 part by weight polytetrafluoroethylene dispersed in .34 part by weight of water.

9. A heat stable grease consisting essentially of an organopolysiloxane fluid of the unit formula $$R_n SiO_{\frac{4-n}{2}}$$

wherein $n$ has an average value from 1.9 to 3.0 and each R is a monovalent radical selected from the group consisting of hydrocarbon radicals and halogenohydrocarbon radicals, a silica filler in amount sufficient to give the desired consistency, a compound selected from the group consisting of graphite and molybdenum disulfide in amount sufficient to give the desired lubricant properties, and .05 to 3.0 percent by weight, based on the weight of the organopolysiloxane fluid, of a solid fluorocarbon polymer selected from the group consisting of polytetrafluoroethylene and polymonochlorotrifluoroethylene.

References Cited in the file of this patent

UNITED STATES PATENTS

| | | |
|---|---|---|
| 2,449,510 | Robertson | Sept. 14, 1948 |
| 2,466,642 | Larsen | Apr. 5, 1949 |
| 2,467,145 | Morway et al. | Apr. 12, 1949 |
| 2,486,674 | Pederson | Nov. 1, 1949 |
| 2,644,802 | Lontz | July 7, 1953 |
| 2,742,428 | Agens | Apr. 17, 1956 |
| 2,838,457 | Ballentine | June 10, 1958 |
| 2,877,182 | May | Mar. 10, 1959 |
| 2,927,895 | Neunherz | Mar. 8, 1960 |
| 2,940,947 | Welch et al. | June 14, 1960 |

FOREIGN PATENTS

| | | |
|---|---|---|
| 664,546 | Great Britain | Jan. 9, 1952 |
| 761,965 | Great Britain | Nov. 21, 1956 |